United States Patent [19]

Gomersall et al.

[11] Patent Number: 4,500,880
[45] Date of Patent: Feb. 19, 1985

[54] REAL TIME, COMPUTER-DRIVEN RETAIL PRICING DISPLAY SYSTEM

[75] Inventors: Earl R. Gomersall, Inverness; Arthur F. Cipolla, Chicago, both of Ill.

[73] Assignee: Motorola, Inc., Schaumburg, Ill.

[21] Appl. No.: 280,663

[22] Filed: Jul. 6, 1981

[51] Int. Cl.³ .............................................. G09G 3/00
[52] U.S. Cl. ........................ 340/825.35; 340/286 M; 340/802; 340/717; 235/385; 235/454; 186/61; 364/464; 364/709
[58] Field of Search ............... 235/383, 385, 378, 454; 364/464, 478, 709, 710; 340/825.34, 825.35, 348, 717, 789, 798, 799, 800, 801, 802, 804, 794, 795, 340, 811, 814, 784, 765, 286 M; 370/92; 186/52, 55, 186, 56, 61

[56] References Cited

U.S. PATENT DOCUMENTS

| | | | |
|---|---|---|---|
| 2,919,851 | 1/1960 | Otis | 186/59 |
| 3,235,713 | 2/1966 | Stern | 364/464 |
| 3,774,158 | 11/1973 | Clark | 340/717 |
| 3,991,299 | 11/1976 | Chadima, Jr. et al. | 235/472 |
| 4,002,886 | 1/1977 | Sundelin | 340/825.35 |
| 4,028,537 | 6/1977 | Snow | 235/472 |
| 4,071,740 | 1/1978 | Gogulski | 186/61 |
| 4,293,947 | 10/1981 | Brittain | 370/92 |
| 4,305,060 | 12/1981 | Apple et al. | 340/825.34 |
| 4,438,432 | 3/1984 | Hurcum | 340/825.35 |

Primary Examiner—Marshall M. Curtis
Attorney, Agent, or Firm—Donald B. Southard; James W. Gillman; Edward M. Roney

[57] ABSTRACT

A computer driven, informational display system is disclosed which visually displays selected information in real time. The arrangement is particularly adapted for displaying pricing and other associated information in retail establishments which utilize the standard Universal Product Code for the items of merchandise for sale. The particular bar code forms a unique address for respective remote display modules at selected locations throughout the store. A source of computer-based information is applied to all of the remote display units in parallel. When a particular display module detects its unique address, the information to be displayed, which follows the addressed code, is processed and used to control the operation of an LCD display.

12 Claims, 15 Drawing Figures

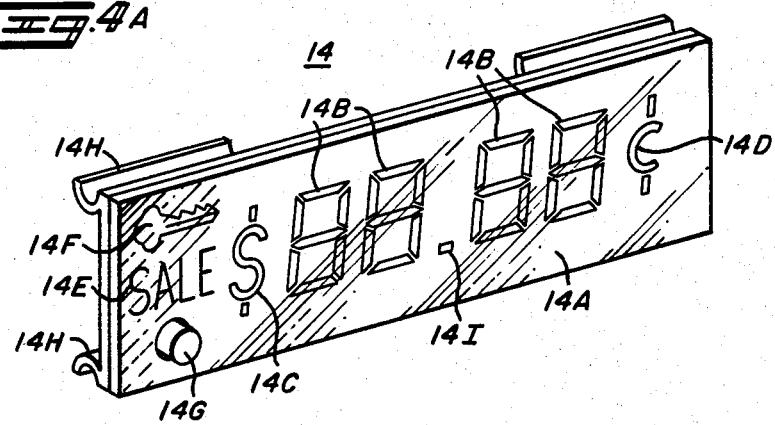
Fig.4A
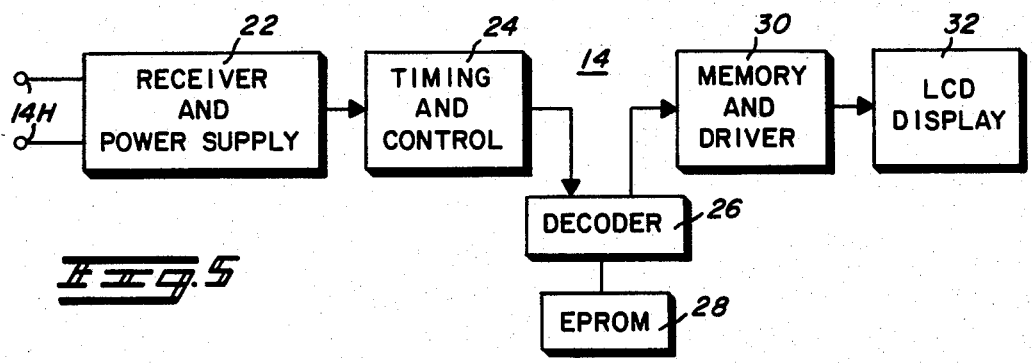
Fig.5
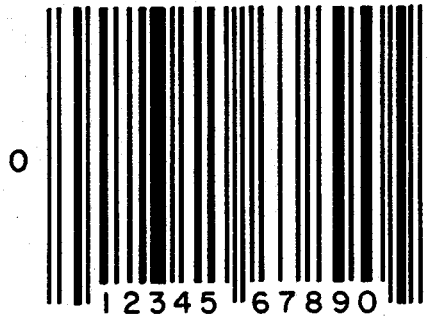
Fig.6
Fig.7

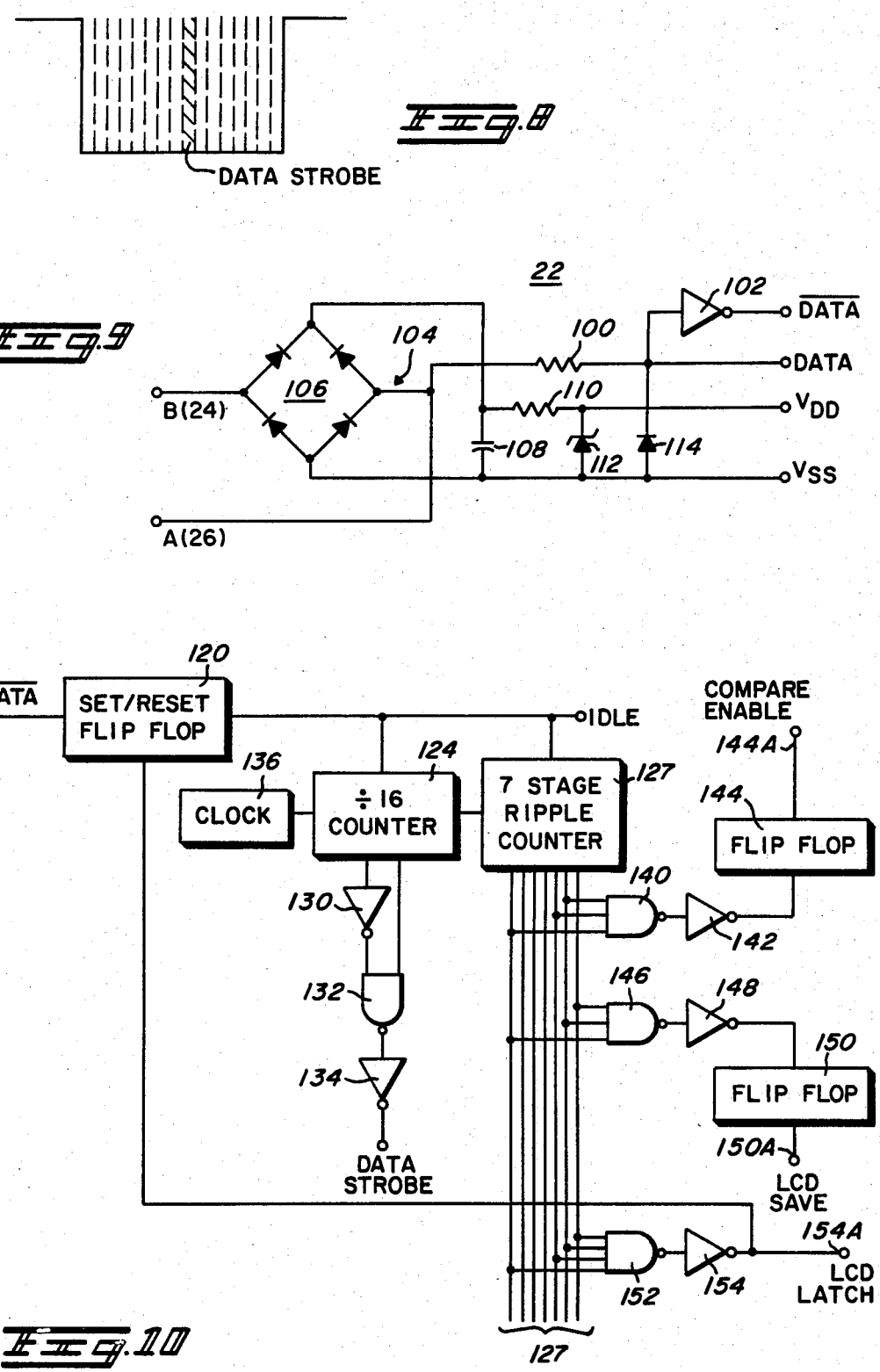

REAL TIME, COMPUTER-DRIVEN RETAIL PRICING DISPLAY SYSTEM

BACKGROUND OF THE INVENTION

The present invention relates generally to display systems and more particularly to a real time, computer-driven, retail pricing display system for automatically displaying pricing and other specialized information for items which are identified with a standard universal product (bar) code.

For the most part retail pricing indicators for displayed merchandise in grocery, hardware, and other retail (and perhaps even wholesale) establishments are generally in the form of plastic numbers that fit in or on a track or holder in front of or below the associated merchandise. On occasion, price indicators are pre-printed cards or stamped adhesive background tags or labels. Still another method involves stamping prices in ink on the particular items of interest. All current methods, including those enumerated, have serious disadvantages of one sort or another. They can be manipulated by customers, stolen or otherwise tampered with. Moreover, all such referenced indicators must necessarily be changed manually in the event of a price change, or sale event, or simply a change in merchandise location.

One significant innovation in recent years is the development of the Universal Product Coding (UPC) System. The UPC or "bar" code can be considered as a series of vertical bars varying in width and spacing which may be read by machine or by optical means as binary information. The code may contain pricing, manufacturer identification as well as other information, such as size, contents, etc. The deciphered coding digits may then be indexed with a computer file which contains the actual pricing and/or information. The UPC coding arrangement permits the automatic check-out of merchandise at one or more check-out counters by optical scanning of each items' bar code which, when fed to the store point-of-sale (POS) computer, identifies the product and automatically registers the established price for that item. Clerks accordingly are no longer required to first manually read and then enter the price of each item into a conventional cash register.

It will be appreciated that these benefits can be multiplied substantially if the merchandise does not have to be manually priced in addition to the UPC bar code. However, several problems arise regarding the elimination of manual pricing. First, the retail or wholesale establishment must establish and maintain credibility with the customer that the bin or shelf price is in fact accurate. A conventional policy frequently adopted is that bin price takes priority over computer price, which in turn of course encourages bin price manipulation. To maintain bin price accuracy, constant and expensive policing must in fact occur.

Still another problem arises simply because of the sheer volume of price changes involved. It has been estimated that approximately 10% of the prices of a store's inventory are changed weekly to reflect cost variations. Perhaps another 10% of the prices may be changed so as to reflect sales specials, and then changed back again when the sale event is terminated. For the most part, such price changes are effected on overtime, or at least when the store is closed to normal business. Further, since auditing a price is ordinarily must be accomplished with the aid of a printed book, it is next to impossible to maintain computer prices (the scanned prices) synchronous with book prices.

SUMMARY OF THE INVENTION

Accordingly, it is an object of the present invention to provide a computer driven retail pricing display system which overcomes the foregoing deficiencies.

A more particular object of the present invention is to provide a retail pricing display system of the foregoing type which electronically displays item prices at the shelf or bin location, which are displayed in real time and are assumed of being identical to the prices programmed in the associated point-of-sale (POS) computer file.

Another object of the present invention is to provide a retail pricing system of the foregoing type wherein the UPC bar code of an item may be utilized as the address code for the associated electronic display device, which address code may be conveniently changed at will and while at its particular location.

In practicing the invention, a computer driven informational display arrangement is provided which is intended to display selected information in real time. The display system may be suitable for use with retail establishments such as grocery stores, hardware stores and the like, or even with wholesale establishments. The selected information, usually in the form of pricing information is intended for display on an associated remote display unit or module associated with a particular item. The system is predicated on the basis that a source of information to be displayed is contained within an associated on site computer at the retail or wholesale establishment. The information is in the form of an address code in a standard UPC format together with the information to be displayed. A plurality of display units are positioned at selected locations throughout the store, each responsive to a particular address code to selectively display the associated information (pricing) which follows the address code. Each of the plurality of display units are hard wired to the store based computer which carrys both power and associated data.

Each of the remote display units includes means for receiving applied information from the store based computer and decoding the address code portions thereof to determine whether there is a correspondence to a stored address, which when occurring, causes the data following the address code to be further processed and applied to an associated LCD display. The LCD continuously displays the information until changed by reapplication of new information by the associated store computer.

Each of the display units includes an EPROM for storing a programmed address code to compare with those contained within the information applied by the store based computer. The particular address code of any of the display units may be quickly and conveniently change at location by the use of a convenient programming fixture in which a selected display unit may be placed. The fixture includes means for erasing the old or undesired address code. A new address code is reprogrammed therein by using an optical scanner associated with a fixture to scan a desired UPC code from an item of merchandise to which the display unit is to be associated.

BRIEF DESCRIPTION OF THE DRAWINGS

The features of the present invention which are believed to be novel are set forth with particularity in the appended claims. The invention itself, however, together with its further objects and advantages, may be best understood by reference to the following description when taken in conjunction with the accompanying drawings, in which:

FIG. 4A is an enlarged perspective view of the remote display unit shown in FIG. 3;

FIG. 5 is a block diagram of the remote display unit of FIG. 4A;

FIG. 6 is a graphic representation of a conventional universal product code;

FIG. 7 is a graphic representation of the code format used to transmit information by the store based computer to the various remote display units;

FIG. 8 is a graphic representation of a single bit in which a data strobe is developed for timing purposes and processing of the associated information;

FIG. 9, is a circuit schematic of the power supply and transmission line for data to various of the display units;

FIG. 10 is a schematic block diagram of the timing and control stage of FIG. 5;

DESCRIPTION OF THE PREFERRED EMBODIMENT

Figure 1:
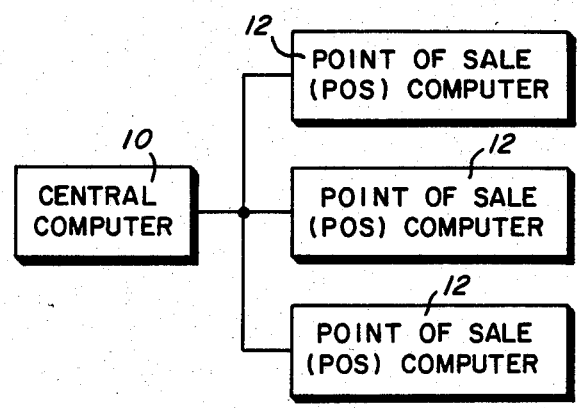
FIG. 1 is a block diagram showing a central computer controlling a plurality of point-of-sale computers at various retail establishment locations.

Referring now to the drawings, a typical arrangement for pricing control is shown in FIG. 1 comprising a master computer 10 at some central location and which feeds one or more store based, point-of-sale (POS) computers 12. The main computer typically is utilized to store all of the pricing information for the various items or merchandise being offered for sale in the individual stores. The pricing information is either included in or is associated with a unique universal product code (UPC). The UPC code is included on each item of merchandise so as to facilitate the use of automatic check stand equipment. An optical scanner (not shown) "reads" the particular UPC code which the computer then recognizes and supplies the correct price to a cash register without manual entry by the clerk. The pricing information is updated from time to time in the master computer as required.

As referenced herein previously, the present invention contemplates the use of the standard UPC code in a computer driven informational, i.e., retail pricing, display system which eliminates the need for manual pricing operations with tags, labels, stamping and the like. Moreover, the desired pricing and other information is displayed in real time and may be changed at will at any time, during as well as outside of normal business hours.

Figure 2:
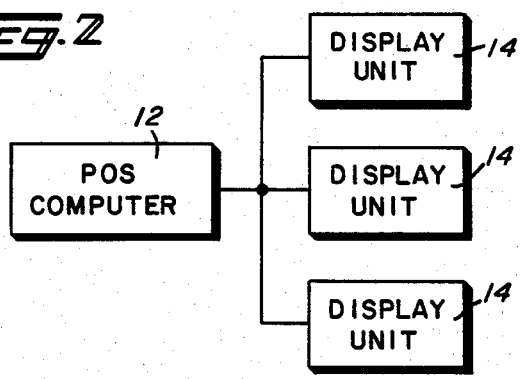
FIG. 2 is a block diagram of a computer driven display system in accordance with the present invention.

FIG. 2 shows in block diagram form an informational display system in accordance with the present invention which comprises a POS computer 12 interconnected to a plurality of remote display units or modules 14. POS computer 12 may be interconnected to a master computer as shown in FIG. 1, or it maybe independently serviced and operated at the particular store.

As referenced previously, the POS computer is programmed with the UPC code as it appears on each item of merchandise, together with the pricing and other information. Periodically, the UPC code and information to be displayed is sent to the group of remote display modules 14. Each display unit 14 is programmed with the particular UPC bar code of the item of merchandise with which it is to be associated. The UPC code then forms the unique address code of the particular display module 14. When the specific UPC code, serving as the unit's unique address, is recognized, the additional information following the UPC code is then processed by that unit and then displayed in visual form. Such information will be at least retail pricing information and, may include even additional information as will be discussed in more detail subsequently.

Figure 3:
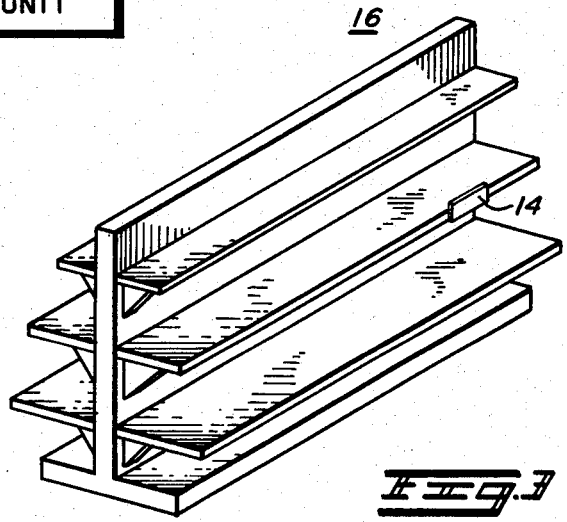
FIG. 3 is a graphic representation of a store shelf on which a remote display unit is mounted, which display unit forms a part of the present invention.

FIG. 3 graphically illustrates a shelving arrangement 16 typical of a retail establishment on which a remote display module 14 is positioned. It is understood that many such modules would be included mounted on the edges of the shelving so as to correspond to the various items of merchandise being displayed for sale. An enlarged perspective view of a remote display module 14 is illustrated in FIG. 4A. The module includes a base or chassis portion 14A on which are positioned at least four 7-segment alphanumeric displays 14b. Additional selective symbols are also included, such as a dollar sign 14c, a cents symbol 14d, a "sale" word symbol 14e, and a key symbol 14f. Still additional words or symbols may be added as desired. An actuation button 14g is also shown, the purpose of which will be referenced subsequently. Display module 14 may be affixed to the store shelving by support brackets 14h extending laterally from the rear of the module 14 as shown. These brackets also serve as the terminals to which operating power may be applied.

Display module 14 may be attached to the edge of the shelving 16 in any suitable way. However, one satisfactory manner is by the use of a support channel such as shown at 20 in FIG. 4B. Channel 20 is affixed to the edge of shelving 16 such as by machine screws 22 or the like. Channel 20 is constructed of any suitable nonconductive material, such as thermosetting plastic, with U-shaped projections 20a and 20b at top and bottom in which wire conductors 24 and 26 extend the entire length thereof, as shown. The module 14 may be snap-fitted into channel 20 with brackets 14h contacting conductors 24 and 26. Conductors 24 and 26, as well as other similar conductors on the other shelving, may be tied together at a suitable junction box (not shown) and from there connected back to the POS computer 12. In this manner, computer 12 is effectively coupled to all of the display modules 14 in parallel.

A block diagram of a display module 14 is shown in FIG. 4 and includes a receiver and power supply portion 22 for receiving data and operating power. The output of receiver stage 22 is then coupled to a timing and control stage 24, the output of which is applied to the input of a decoder 26. Also coupled to decoder 26 is an EPROM 28. The output of decoder 26 is applied to a memory and driver stage 30, the output of which controls the operation of an LCD Display device 32.

In operation, data information is applied to the input of the receiver and power supply 22, such as terminal A in FIG. 9, and from there applied to the data terminal DATA through series resistor 100. The data information is also applied through an inverter 102 and applied to output terminal $\overline{\text{DATA}}$. A suitable voltage, such as approximately 12 volts, is applied between conductors 24 and 26. Such voltage is impressed across terminals A and B when display module 14 is snapped into channel support 20 and converted by the full wave rectifier circuit 104 illustrated in FIG. 9. That is, the computer based information in the form of binary "1's" and "0's" varying between same length level, say +12 volts and a reference (see FIG. 7). This applied voltage is then converted to a suitable DC voltage VDD to operate the remaining stages of the module 14 as will be described. Full wave rectifier circuit 104 includes a four-diode bridge 106, a filter capacitor 108, a series resistor 110, and a Zener diode 112 and clamping diode 114 connected as shown.

As referenced previously, each display module 14 is programmed to have a unique address code in the form of a standard UPC bar code appearing on respective items of merchandise. The UPC bar code is shown graphically in FIG. 6 and consists of a series of vertical stripes of various width and spacings. The UPC bar code is in actuality a series of binary digits, or bits, which represent decimal numbers, 1 through 10. For a more definitive discussion of the background and makeup of the UPC code, see FIG. 7 is a graphic illustration of the character of the data applied by the POS computer 12 to the display modules 14. Each bit is shown as an "X" in a box so as to represent that each bit may be either a mark or a space, or more conventionally, as a binary 1 or 0. The UPC bar code is initially transmitted in the first segment of the information, i.e., bits 1 through 48, as indicated. Four bits are required for each decimal number, 40 bits in all being required to represent a 10 digit number code. The remaining eight bit capacity is for reserve purposes. Following the first 48 bits of information, the next 48 bits represent the desired information to be displayed and is used to control the LCD display 32. Some 29 bits are required to control the four standard seven-segment displays 14b plus the decimal point 14i, with three additional bits controlling the special symbols 14d–14e. The remaining bits of this 48 bit segment are in reserve for controlling any additional symbols that may be added as desired. The remaining 16 bits then, 97 through 113, are used for CRC parity checks. CRC represents cyclic redundancy code. Parity checks are, of course, well known in the art so that detailed discussion should not be necessary.

Returning now to the operation of the individual display modules 14, the data stream comprising the computer-based information is coupled to the input of the timing and control stage 24 as shown in FIG. 10. The binary information is first applied to a set/reset flip-flop 120, which may be a Motorola part MC14013, a CMOS Dual Type D flip-flop. The beginning bit (see FIG. 7) always goes low and may be considered as the start bit to begin the timing operation of the remainder of the circuitry. Upon detection of the start bit, line 122 goes low to permit counters 124 and 126 to begin the counting action. Counter 124 is a 7-stage ripple counter, which may be a Motorola part MC14024, but is connected as a divide by 16 counter. Logic elements 130, 132, and 134 are connected as shown to provide an output at approximately the middle of the count so as to provide data strobe pulse for each bit substantially, as shown in FIG. 8. This provides an output pulse that is centered in the middle of each incoming bit.

Clock 136 is provided in the manner shown and may be a Motorola part MC14411. Clock 136 serves as a bit rate generator and has programmable time bases for one of four multiple output rates. However, an output on the order of 38 KBS has been found to satisfactory for present purposes.

Figure 11:
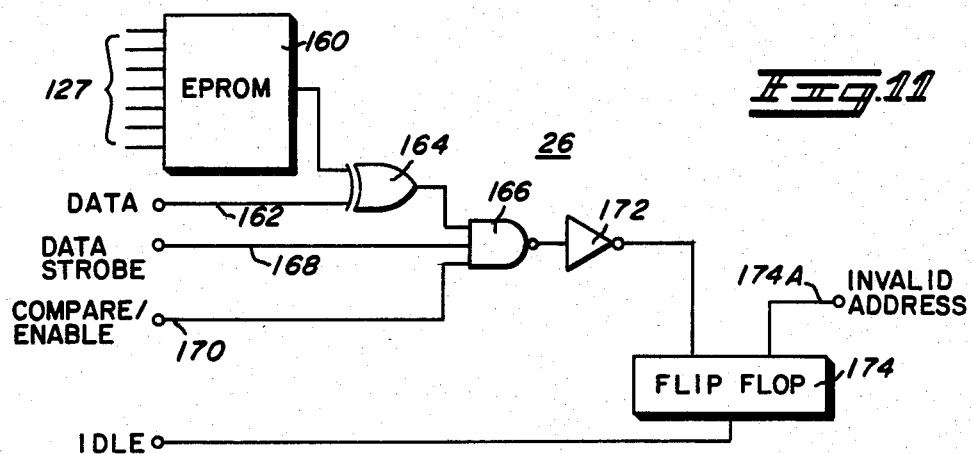
FIG. 11 is a schematic block diagram of the decoder stage of FIG. 5.

Counter stage 126 is also a 7-stage ripple counter, such as Motorola part MC14024. However, counter 126 is utilized to keep track of where each bit is in the frame. Each of the first 48 bits are coupled through the counter 126 and applied to the EPROM 160 of FIG. 11. These bits comprise the address of the particular display module 14 as will be explained in more detail subsequently. In addition, counter 126, in combination with associated logic elements identifies specific bits for other portions of the circuitry. For example, counter 126 in combination with NAND 140 and inverter 142 identifies the 49th bit, which when coupled to flip-flop 144 provides a signal condition on the output 144a labelled "compare/enable". Likewise, counter 126 in combination with NAND 146 and inverter 148 identifies the 97th bit, which when coupled to flip-flop 150 provides a signal condition on the output 150a labelled "LCD Save". Finally, counter 126 in combination NAND 152 and inverter 154 identifies the 113th and last bit in the applied data segment and is labelled "LCD Latch".

In the application of the data stream, the first 48 bits are applied via counter 126 to EPROM 160 via the group of 7 conductors identified at 127. Each bit is checked for correspondence with those programmed in the EPROM 160. If a concurrence is evident, a signal is provided at the output, which will then agree with the particular bit applied to the data line 162. Both signals are applied to exclusive OR 164, which provides an output signal if, and only if, the two signals at the input do not agree. The output of exclusive OR 164 provides one input of a NAND 166. Data strobe information on line 168 and compare/enable signal information on line 170 form the two other inputs of NAND 166. The output of NAND 166 feeds an inverter, the output of which is coupled to a flip-flop 174, the latter which may be a Motorola part MC14013.

In operation, the first 48 bits are checked by EPROM 160 and provides a signal if agreement is made. If the output of EPROM 160 agrees with the data on data line 162, then exclusive OR has no signal, or a low signal condition, at its output. If there is no agreement at any time when there is a data strobe pulse, and which is also during the first 48 bits time frame during which the compare/enable line 170 is at a high level, then a low signal condition occurs at the output of NAND 166. This is converted to a high or "1" by inverter 172 and is applied to flip-flop 174, thereby resetting and providing an invalid address signal at the output 174a. If complete agreement is found during all of the first 48 bits constituting the address of the associated display module 14, a low signal remains at the output of exclusive OR 164, and flip-flop 174 is not reset and no invalid address signal is ever generated.

Figure 12:
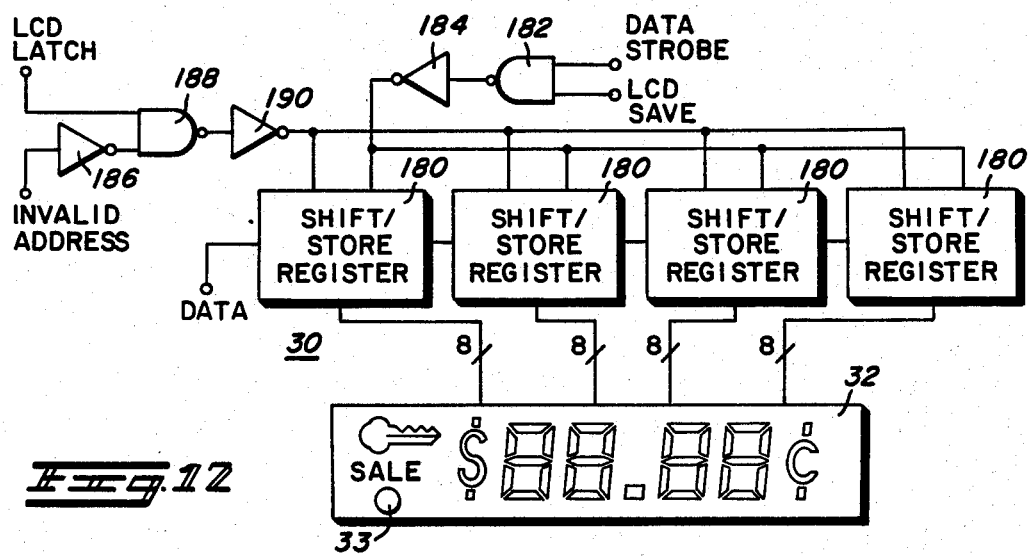
FIG. 12 is a block diagram of the memory and driver and a graphic representation of the LCD display of FIG. 5.

Referring to FIG. 12, the memory and driver stage 30 is shown interconnected to the LCD display 32. The data stream is shown coupled to four 8-stage registers 180 in series, which in turn, depending on the stored information, controls the operation of LCD display 32. The first 48 bits are shifted into registers 180, but then are shifted out with the application of the next 48 bits, i.e., bits 49 through 97. Upon occurrence of bit 97, an output is generated at output 150a of flip-flop 150 (see FIG. 11), and is applied to the "LCD Save" input of NAND 182. At the next data strobe, bits 49 through 97 are effectively locked into registers 180. Upon the occurrence of bit 113, at the output 154a, and assuming there is no invalid address, a signal is generated by NAND 188 and inverters 186 and 190, which when applied to an appropriate input of registers 180 causes the information to be shifted out and applied to LCD Display 32 to thereby activate the same to display the desired pricing and other information in conventional manner. The LCD display 32 continues to display this information until altered by new information from registers 180 at some later time.

It is to be noted that at all times when there is no invalid address signal generated by flip-flop 174, a high signal is generated by inverter 186. Thus only an LCD latch signal is necessary as generated at the output 154a at the occurrence of the 113th bit to cause the information stored in the registers 180 to be applied to LC display 32.

Figure 13:
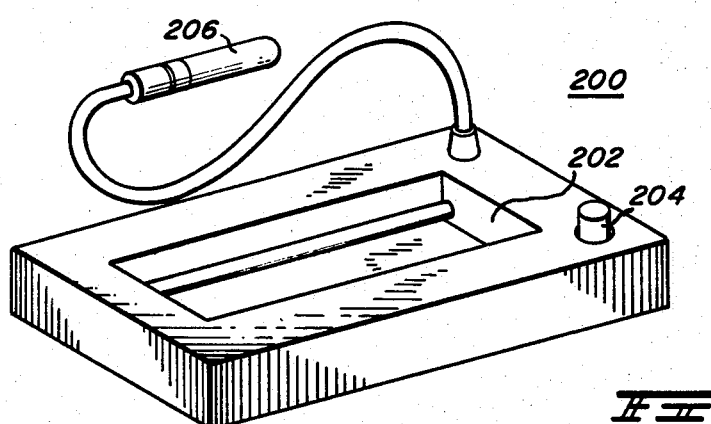
FIGS. 13 and 14 are, respectively, a graphic representation of the programing fixture for changing the address code of an individual remote display unit and a schematic illustration of an associated Transmit Section.

As mentioned previously, the address code programmed in an individual display module 14 may be conveniently changed at any time and entirely at location. This is effected by the EPROM Writer and Eraser Unit 200 shown in FIG. 13. Unit 200 includes an appropriate cavity 202 into which a display module 14 may be inserted and operating power applied thereto. The unit 200 includes the appropriate capability of providing the proper medium to cancel the programmed information in the EPROM. For example, if ultraviolet light is the cancelling medium, suitable ultraviolet light is generated by depressing a provided actuator, such as indicated at 204. With the previous address code cancelled out of the module 14 a new address code may be programmed into it by the bar code reader 206 used to scan the UPC code on the new item of merchandise with which the reprogrammed module is to be associated. Such bar code optical scanners or wands are well known in the art such that detailed description of its operation is deemed unnecessary.

One further capability is provided by the system of the present invention. That is, as an aid in inventory control. As mentioned previously, each of the display modules 14 includes an actuator button 14g. Upon a person checking stock, whether during the normal business hours or outside thereof, noting that some particular merchandise is low on the shelf, activates button 14g which causes a number to be entered into the particular display module which represents units of a particular merchandise to be replenished. Such number is subsequently transmitted back along conductors 24 and 26 to the POS computer 12. At some particular time, computer 12 may be monitored and the fact that particular numbers have been received from particular display units will serve to indicate that stock with which those UPC bar codes are associated is low and should be replenished.

Figure 14:
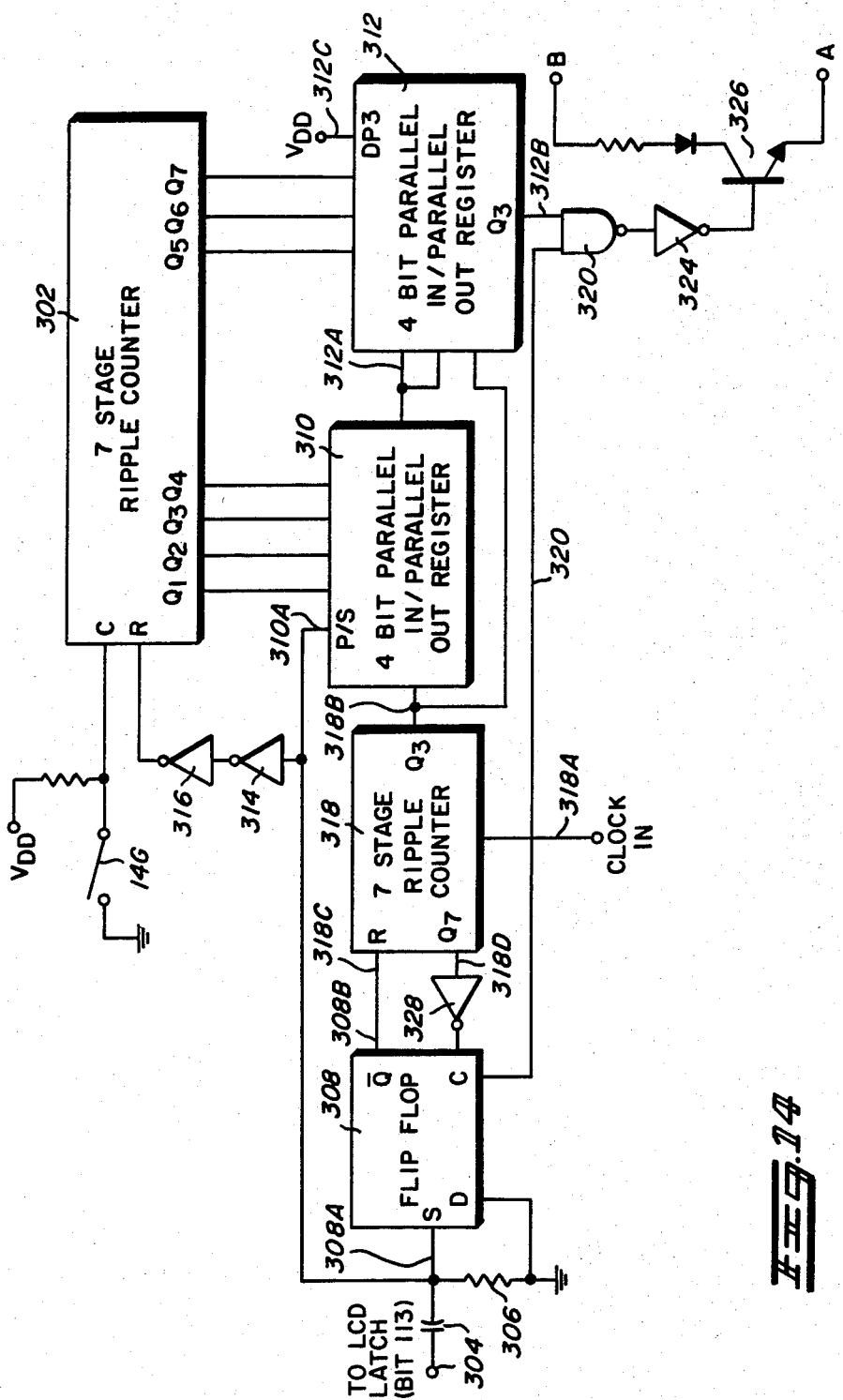

FIG. 14 illustrates schematically the circuit arrangement for an associated Transmit Section 300 for accomplishing the desired objective. As the switch or actuator button 14g is depressed on a particular display module 14, a seven-stage counter 302, which may be a Motorola part MC14024, is incremented accordingly. This allows a number that is selected, up to a maximum count of 127 ($2^6$), to be counted by counter 302 and stored therein for subsequent transmission back to the associated POS computer 12. At the end of each frame bit time (bit 113), a pulse is generated by a capacitor 304 and resistor 306 which is utilized to set a flip-flop 308, which may be a Motorola part MC14013, as well as to enable the P/S (parallel/serial) input 310a of a first four bit Parallel In/Parallel Out Shift Register 310, which in turn is also connected to a like shift register 312. Registers 310 and 312 each may be a Motorola part MC14035. The enabling of input 310a causes the count information in counter 302 to be shifted and stored in counters 310 and 312, as indicated. The pulse applied to input 310a is also applied through inverters 314 and 316 to counter 302 to reset the count.

The not-Q output 308b normally inhibits the seven-stage counter 318. When flip-flop 308 is set, this allows ripple counter 318 to advance and serve as a divide-by-sixteen counter, for bit synchronization, and also a divide-by-three, for bit counting, in the return frame to computer 12. This is necessary because the clock input 318a is running faster than the bit rate. After a count of 16, the falling edge of output 318b (Q3) delineates a bit time, which causes a bit to shifted to the output 312b of register 312. Eight bits are required, one for each output of the counter 302 plus a start bit. It should be noted that the start bit is always a binary "one" which is effected by connecting output 312c (DP3) to the VDD source. This insures a transition of the signal line back to computer 12 for synchronization purposes.

Figure 4B:
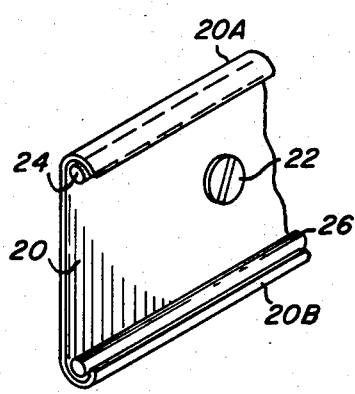
FIG. 4B is a fragmentary view of the bracket included on the edge of a shelf in which the display unit of FIG. 4A is positioned.

As indicated, the output 312b (Q3) of register 312 is gated with flip-flop 308 on line 320 to prevent any spurious transitions on terminals A and B, which are also identified as conductors 24 and 26 (see FIG. 4b and 9). The signals from flip-flop 308 and output 312b of register 312 form the inputs to a NAND 322, which when inverted by inverter 324, is applied to the base of a transistor 326 connected across rails A and B as indicated. The conduction of transistor 326 causes a relatively low impedance across rails A and B, increasing the current therethrough, which is sensed by the POS computer 12 to determine whether or not the information bit returned is a zero or a one.

After eight bits are counted (representing a number up to 127) are counted, the output 318d (Q7) of ripple counter 318 goes low, which is inverted by inverter 328 and used to reset flip-flop 308 so as to disable the transmit section of the device here described until the display module 14 is again polled by the computer 12 and has reached the end of its receive frame.

Thus it will be noted that after the associated POS computer 12 "polls" a module display 14 by sending its unique address code, plus pricing and/or other information, it then waits an appropriate time for an eight bit response from that module, with the first bit serving as an appropriate start bit. The remaining seven bits represent a count of the number of times actuator button 14g has been depressed. If, in fact, the button 14g of any particular module 14 has not been depressed, the transmission section 300 of that module simply sends back a "zero".

Accordingly, what has been shown and described is a novel computer-driven informational display system that displays in real time. Such system is particularly adaptable for retail establishments where merchandise wares include a standard UPC bar code thereon. Redundant pricing of merchandise is effectively eliminated with the attendant inconvenience of labels, tags or stamping with ink or the like. Prices can be changed at will and at any time of the day. Further, the prices displayed are assured of being identical with those in the associated POS computer file, thereby avoiding a source of frequent customer dissatisfaction upon noting price discrepancies between those rung up on the cash register and those displayed on the shelves. Sales can be arranged daily, or even hourly. Even inventory control can be effected without generating paper work and requiring added after business hours activities.

What is claimed is:

1. A computer-driven informational display arrangement for displaying selected information in real time, said arrangement comprising in combination:

a source of computer based information in the form of at least an address code in standard UPC format and information to be displayed;

a plurality of low current drain display units at selected locations, each having externally programmable memory means settable to a particular address in the form of a UPC formatted address code, said display units being responsive to said programmed address code to process and selectively display said information following said address code;

means for applying said source of the computer based information to said plurality of display units;

means for supplying operating power to each of said plurality of display units; and means including optical scanning means for externally programming said memory of any of said plurality of display units with a stored address code while at its said selected location.

2. A computer-driven, retail pricing display system for displaying pricing and other information in real time, comprising in combination:

a source of computer based information in the form of an address code in standard UPC format followd by pricing and other information to be displayed and parity check information;

a plurality of low current drain display units at selected locations, each having externally programmable memory means settable to a particular address in the form of a UPC formatted address code, said display units being responsive to said programmed address code to selectively display the pricing and other information associated therewith;

means for applying said source of computer based information to said plurality of display units;

means for supplying operating power to each of said plurality of display units; and means including optical scanning means for externally programming said memory of any of said plurality of display units with a stored address code while at its said selected location.

3. A computer-driven informational display arrangement in accordance with claim 1 or 2 wherein said display unit means, includes receiver means having power supply means for driving a rectified D-C voltage from the data stream forming said computer-based information and applying the same to a first output terminal, said display unit receiver means further including means for receiving data stream and applying the same to a second output terminal.

4. A computer-driven, informational display arrangement in accordance with claim 3 wherein said timing of control means includes means for detecting the start bit in the data stream forming said computer-based information, means for determining the bit beginning the information to be displayed and means for determining the last bit in the data stream.

5. A computer-driven, informational display arrangement in accordance with claim 3 wherein said decoder means includes an EPROM programmable with standard UPC bar code binary information.

6. A computer-driven, informational display arrangement in accordance with claim 5 wherein said decoder means includes means for checking correspondence between the programmed information in said EPROM with the address code in said computer-based data stream.

7. A computer-driven, informational display arrangement in accordance with claim 6 wherein said decoder means includes means for generating an invalid address signal upon non-concurrence between the programmed information in said EPROM and the address code in said computer based data stream.

8. A computer-driven, informational display arrangement in accordance with claim 3 wherein said receiver means further includes a plurality of shift registers to be loaded with said information to be displayed, means for latching in said loaded information, and means for shifting said information to said display means upon occurrence and detection of said last bit in the data stream.

9. A computer-driven, informational display arrangement in accordance with claim 3 wherein said display means is an LCD display which includes at least a plurality of 7-segment alphnumeric displays.

10. A computer-driven, informational display arrangement in accordance with claim 5 wherein said means for changing the address code of said display units includes an eraseable and reprogrammable EPROM device.

11. A computer-driven, informational display arrangement in accordance with claim 10 wherein fixture means may accommodate said display unit and supply operating power thereto and which fixture means includes means for erasing any previously programmed address code in said memory means and for optically scanning a new UPC bar code and reprogramming the eraseable and reprogrammable PROM therewith.

12. A computer-driven informational display arrangement for displaying selected information in real time, said arrangement comprising in combination:

a source of computer based information provided by an association computer in the form of at least an address code in standard UPC format and information to be displayed;

a plurality of low current drain display units at selected locations, each having externally programmable memory means settable to a particular address in the form of a UPC formatted address code, said display units being responsive to said programmed address code to process and selectively display said information following said address code;

means for applying said source of the computer based information to said plurality of display units;

means for supplying operating power to each of said plurality of display units;

means for selecting a number and transmitting the same back to the computer upon the completion of application of said computer based information to the particular display unit; and means including optical scanning means for externally programming said memory of any of said plurality of display units with a stored address code while at its said selected location.

* * * * *